United States Patent [19]

Graff

[11] 4,173,547

[45] Nov. 6, 1979

[54] CATALYST FOR PREPARING POLYALKENES

[75] Inventor: Renier J. L. Graff, Stein, Netherlands

[73] Assignee: Stamicarbon, B.V., Geleen, Netherlands

[21] Appl. No.: 884,546

[22] Filed: Mar. 8, 1978

[30] Foreign Application Priority Data

Mar. 4, 1977 [NL] Netherlands .................. 7702323

[51] Int. Cl.$^2$ ............................................. C08F 4/64
[52] U.S. Cl. ............................ 252/429 B; 252/429 C; 252/428; 252/430; 252/431 R; 526/151
[58] Field of Search ............... 252/429 B, 429 C, 428, 252/430, 431 R

[56] References Cited

U.S. PATENT DOCUMENTS

| 3,094,568 | 6/1963 | Hay et al. ............... | 252/429 B X |
| 3,549,717 | 12/1970 | Itakura et al. ........... | 252/429 B X |
| 4,004,071 | 1/1977 | Aishima et al. ......... | 252/429 C X |

FOREIGN PATENT DOCUMENTS 1436426  5/1976  United Kingdom ................ 252/429 C

*Primary Examiner*—Patrick Garvin
*Attorney, Agent, or Firm*—Cushman, Darby & Cushman

[57] ABSTRACT

An improved process for polymerizing α-alkenes and using Ziegler-type catalyst compositions is described.

The Ziegler-type catalyst composition comprises a component consisting of an organoaluminum compound, an organomagnesium compound and a titanium compound or their reaction products on an inorganic porous solid particulate carrier material, wherein the aluminum/magnesium/titanium components are distributed and absorbed onto the inorganic carrier material, in separate steps, with removal of solvent or diluent therein between whereby the final catalyst/carrier composition when used in the polymerization process produces solid particulate polymer products with narrow particle size distributions.

13 Claims, No Drawings

CATALYST FOR PREPARING POLYALKENES

BACKGROUND OF THE INVENTION

The invention relates to the preparation of catalysts components, and to a process, for polymerizing an α-alkene in the presence of Ziegler-type catalysts that have been obtained by having an organomagnesium compound and an organoaluminumhalide react in the presence of a carrier, by combining the reaction product with a tetravalent titanium compound and/or compound of another transition metal from the groups IV up to and including VI of the Periodic System, in particular a vanadium compound, and by activating the reaction product with an organoaluminum compound after reduction of at least a major part of the transition metal compound.

The present invention relates in particular to the polymerization of ethylene, or copolymerization of ethylene with minor quantities of propylene and/or butylene.

So-called Ziegler-type coordination catalysts for polymerization of α-alkenes are generally known. Many and various kinds of proposals to improve the properties of such catalysts have become known. However, catalyst systems of this kind are at present still being examined and developed on an extensive scale because of the advantages and disadvantages in relation to improving such properties as the more or less easy preparation, activity of the catalyst and allied polymer yield, reproducibility thereof, and the like.

As a rule, it appears that a given catalyst component, which is suitable in case of a particular catalyst composition, and which then brings about an improvement in one or several respects, is, even in the most favorable case, not only not active for its purposes in use with a different composition, but may also often lead to adverse effects on the catalyst properties or on the product properties of the polymer prepared therewith.

Therefore, no guidelines have or can yet be established for the development of Ziegler-type catalyst compositions for polymerization of α-alkenes.

This applies not only in relation to the catalyst components and the ratios in which they are present in the catalyst composition, but also in relation to the particular method used for preparing the catalyst. For instance, the sequence used for combining the components, the temperature employed, and like factors may have important influences on the catalyst behavior, but in an unpredictable way.

A great many such catalyst systems are based on the reduction of a transition metal compound, particularly a titanium compound, with an organoaluminum compound, whereupon, generally, the reaction product is thereafter activated with an organoaluminum compound. It has also been proposed to reduce the transition metal compound with an organomagnesium compound, for instance as in U.S. Pat. No. 3,392,159. From this specification it is also known that the sequence of adding the catalyst components may exert a particularly great influence on the ultimate properties of the catalyst system, especially activity which is especially very strongly influenced by order of addition. For instance, through the addition of an organomagnesium compound to a titanium compound, catalysts can be obtained whose activities surpass those of catalyst systems prepared by adding the titanium compounds to the organomagnesium compounds, by several orders of magnitude.

Applicant's British patent specification No. 1,436,426 describes the polymerization of α-alkenes in a diluent, or liquid monomer, in which the polymerization is carried out in the presence of a catalyst prepared by having an organoaluminum halide compound react with an organomagnesium compound in an inert diluent, and in the presence of a carrier, and by subsequently combining the reaction mixture with a tetravalent titanium compound. If necessary, there may be a washing out and/or heating of the catalyst suspension formed after the reduction of at least a major part of the tetravalent titanium, and then activating of the resulting reaction product with an organoaluminum compound. In the preparation of that catalyst the alkylaluminumhalide and the magnesium compound are both introduced into the diluent in which the carrier has already been suspended. Next, a solution of $TiCl_4$ is slowly added thereto. The reaction product which thus forms is thereafter activated with an organoaluminum compound.

Though catalysts prepared in this way are highly active, the characteristics of the polyalkene powder prepared therewith, in particular of polyethylene, still may be improved, especially because of rather broad particle size distributions and too high a content of fines, i.e., particles having a particle size of less than $70\mu$.

Variations in the particle size of polyalkenes cause problems in their use, including difficulties in handling the same in automatic feeding equipment, and non-uniform performance during film-forming, casting, molding or other operation.

DESCRIPTION OF THE INVENTION

A method has now been found for the preparation of an improved catalyst component. Further, an improved process for ethylene polymerization has been found using the said improved catalyst component.

More particularly, a process has been developed by which solid particulate polyalkene polymers may be prepared having a substantially pre-determined particle size and particle size distribution range, controlled by the catalyst preparation for a given set of polymerization reaction conditions.

According to this invention, in general, the said improved catalyst component is prepared by sequentially treating the carrier material separately with an organoaluminum halide compound and with an ether-free organomagnesium compound, in either order, and with the carrier having been separated from the respective liquid phases following each such treating step, and thereafter treating the carrier composition with a tetravalent titanium compound (or other transition metal compounds as described below). The supported catalyst component may be subjected to a heat treatment as described below. The resultant soupported catalyst component may then be activated by contacting the same with an organoaluminum compound.

More particularly, it has now been found that a polymer, in particular polyethylene, with good powder characteristics is obtained by polymerizing one or more olefins, particularly ethylene, optionally with minor quantities of propylene and/or butylene, with a catalyst composition comprising a catalyst component which has been prepared by combining a carrier material with an organoaluminumhalide compound (as such or in solution) of the general formula $R_mAl\ X_{3-m}$ (wherein each of the R symbols independently represents a hydrocarbon radical with from 1 to 30 carbon atoms, and each X represents a halogen atom, and m represents a number smaller than 3), followed by separating the treated carrier from the liquid phase (by evaporating or decanting and, if required, washing out solvent traces), thereafter treating the carrier with an ether-free solution of an organomagnesium compound, having at least one hydrocarbon radical of from 1 to 30 carbon atoms bound to the magnesium atom. Alternatively, the first treatment may be with the said magnesium compound, followed by the aluminum compound treatment. In either case, the process is conducted so that the carrier is separately contacted with both an organoaluminum halide compound and an organomagnesium compound. The carrier so treated is then separated from the liquid phase (by evaporating or decanting and, if necessary, washing out), and only thereafter contacted with a tetravalent titanium compound (and/or a compound of another transition metal from the groups IV to VI inclusive of the Periodic System, in particular a vanadium compound or a solution of said transition metal compound(s)). The catalyst component on the carrier so obtained may then be separated from the liquid phase by evaporating or decanting and, if necessary, washing out. Often, it is favorable to subject the resulting carrier/catalyst component to a heat treatment.

Investigations by applicant have shown that in the preparation of a catalyst in the presence of a carrier, for instance, according to a process as described in applicant's British patent specification No. 1,436,426, minor quantities of the reducing organometallic compound(s), such as the organomagnesium- and/or organoaluminum halide compound, remain in solution and are not bound on the carrier. Owing to the presence of this (these) dissolved organometallic compound(s), reduced transition metal compound dissolved or dispersed in the diluent is also formed, which compound is most probably not, or is at least less strongly, bound on the carrier. It is assumed, although this must not be considered a statement binding the applicant, that several properties of the polymer, namely the particle size and the particle size distribution, are influenced by this circumstance, and that the catalyst particles or components not present on the carrier itself cause the formation of small polymer particles which in turn adversely influence the polymer powder properties.

By conducting the treatments of the carrier composition with the various components in separate steps, and by separating the carrier compositions from the respective liquid phases after each such step, and by using the various components described below, the improved catalyst component composition and process of this invention are achieved.

In particular, this invention provides a polymerization process in which the particle size of the resulting solid particulate polymer can be closely predetermined by selection of the particle size of the carrier component itself, but this is achieved only if the method of the invention for depositing the catalyst components onto the carrier material is followed.

THE CARRIER

The carrier to be used in the process according to the present invention is, preferably, a porous, finely divided inorganic material, such as a metal oxide or a metal salt. The nature of the carrier may affect the activity of the catalyst and the properties of the polymer.

In general, the carrier particle size should not be larger than about 200 microns. If the carrier material is too coarse, unfavorable results are produced, such as a low bulk density for the polymer powder. The optimum particle size of the carrier material can be easily established by experiment. Preferably, the carrier should have an average particle size of less than 100 microns. Although very fine carrier material can be used, as a rule, for practical reasons, the carrier particle size should be at least 0.1 micron, and most preferably at least 1 micron. Generally, if a fine carrier material is used, the particle size of the polymer will be smaller than it is the case from use of coarser carrier material. The optimum particle size of the carrier can be established easily by experiment, for it has also appeared that the particle size of the resulting polymer powder will again start to decrease when using a carrier above a certain particle size.

Examples of suitable carriers include metal oxides, hydroxides, halogenides or other metal salts, such as sulphates, carbonates, phosphates, silicates. Although salts or oxides of this kind may contain the most divergent metal ions, cheap compounds with non-toxic metal ions are preferred on practical grounds.

Compounds of metals from Groups I and II of the Periodic System, such as salts of sodium or potassium and oxides or salts of magnesium or calcium, for instance the chlorides, sulphates, carbonates, phosphates or silicates of sodium, potassium, magnesium or calcium and the oxides of hydroxides of, for instance, magnesium or calcium are highly suitable. Also oxidic carriers, such as silica, alumina mixed alumina-silica, zirconia, thoria are quite suitable. Of these oxides, silica, alumina and the mixed alumina-silicas, and more particularly silica, are preferred. Silica is known to exist in a great many different forms. Those silicas having a large specific surface area and a large pore volume are highly suitable.

Although the above-mentioned inorganic carriers are preferred, also other materials, for instance, the very polymer powder to be prepared, may also be used for carrier material.

In general, the particle size distribution of the carrier does not influence the activity of the catalyst, but does influence the properties of the polymer, notably the free-flowing properties thereof. It is an important discovery that when the particle size distribution range of the carrier is narrow, so also a polymer powder product having a relatively narrow particle size distribution range can be obtained.

Preferably, the porous inorganic carriers used should have a great internal porosity, i.e., those materials whose pore volume forms an appreciable part of the volume of the particles. This internal porosity may be measured as the ratio between the pore volume and the weight of the material and can be determined by the so-called BET-technique, described by S. Brunauer, P. Emmett, E. Teller in Journal of the American Chemical Society, 60, pp. 209-319 (1938). Especially suitable for use in the present invention are those carrier materials having an internal porosity which is larger than about 0.6 cm$^3$/g. The porous carriers used should also generally possess a specific surface area which is larger than about 50 m$^2$/g, and usually in the order of magnitude of about 150 to about 500 m$^2$/g. These specific surface areas are measured according to the above-mentioned technique of Brunauer, Emmett and Teller, with further use of the standardized method as described in British Standards BS 4359, volume 1 (1969).

Inasmuch as the organometallic compounds of the catalyst component react with water, the carrier material should also be substantially dry. A very severe drying, however, is not always necessary and is sometimes even undesirable since the presence of minor quantities of moisture often do not appear to be harmful and may sometimes even lead to an increase in the activity (which can be easily established in a given case by experiment). Water which is physically bound to the carrier, however, must be removed. As a rule, suitable oxidic carriers may contain a minor amount of chemically bound water, which is determined as amount of OH groups per gram, e.g., in the range of 0.5 to 5 mmoles of OH-groups per gram of carrier.

When the polymer itself is used as the carrier, no limitation is, in principle, imposed on the quantity thereof which is employed, although, from a point of view of efficiency, unnecessarily large quantities are undesirable.

In general, when other carriers are applied, it is desirable that the quantity thereof in the polymer be kept low. If the carrier used is, however, at the same time a usual polymer additive, such as magnesium oxide or calcium stearate, such quantities thereof can be employed for use as the carrier as would correspond with the quantity required as an additive to the polymer.

The porous carrier which is employed is advantageously subjected to a thermal treatment, prior to their being contacted with the organometallic compound. This treatment is carried out at a temperature of about 100° to 1000° C., preferably from about 300° to 800° C. The temperature to which the carrier is heated is preferably chosen as being below the temperature at which the carrier material itself commences to sinter, in order to avoid a decrease in the pore volume and the specific surface area. The pressure at which this treatment is carried out and the atmosphere in which the work is carried out are not critical, but by preference, the treatment is carried out at atmospheric pressure and in an inert atmosphere. The duration of heat treatment is also not critical and may generally be from about 1 to 24 hours.

THE ORGANO ALUMINUM HALIDE COMPONENT

The halogen atoms in the organoaluminum halide compound are generally bromine or chlorine, particularly chlorine. The hydrocarbyl radicals represented by R in the formula $R_mAl\ X_{3-m}$ are, by preference, straight or branched alkyl groups, which need not be identical. In general, these are alkyl groups with 2 to 8 carbon atoms, namely ethyl- or isobutyl-groups.

For instance, monoethylaluminumdichloride, sesquiethylaluminumchloride or diethylaluminumchloride may be used, and also the coresponding compounds with other alkyl groups, such as the isobutylaluminum compounds. One may also start from mixtures of compounds having the above-mentioned formula and also include in such mixtures trialkylaluminum compounds, for instance.

The Organo Magnesium Component

Organomagnesium compounds which are used by preference are compounds of the formula $MgR_2'$, in which the symbols $R'$ each independently represent a hydrocarbyl group with 1 to 30 carbon atoms. The hydrocarbyl groups represented by R may be alkyl radicals, aryl radicals, cycloalkyl radicals, aralkyl radicals, alkenyl radicals or alkadienyl radicals, and are preferably alkyl- or cycloalkylradicals.

Examples of magnesium compounds suitable for the present process include diethylmagnesium, dipropylmagnesium, diisopropylmagnesium, dibutyl- or diisobutyl-magnesium, diamylmagnesium, dihexylmagnesium, dicotylmagnesium, etc., and also didecylmagnesium or didodecylmagnesium, as well as dicycloalkylmagnesium compounds with identical or different cycloalkyl groups having 3 to 12 carbon atoms, (preferably, 5 to 6 carbon atoms).

Of the aromatic magnesium compounds, diphenylmagnesium is preferred although there may also be used other compounds, like ditolyl- and dixylylmagnesium, as well as other magnesiumaryls, which contain 2 or more aromatic nuclei, whether or not condensed.

Catalysts obtained with diarylmagnesium compounds often are less active. The diarylmagnesium compounds are not soluble in aliphatic hydrocarbons. In the practice of the polymerization on a technical scale, the use of solutions in aromatic hydrocarbons is an objection both on account of the toxicity thereof and because of the problems which will then present themselves in the recirculation.

Accordingly, by preference, a dialkylmagnesium is used with 1 to 10, particularly 4 to 10, carbon atoms in the alkyl group.

The organomagnesium compounds can be prepared according to the process of the U.S. Pat. No. 3,737,393 or according to any other suitable method for preparation of ether-free solutions.

The Transition Metal Component

Transition metal compounds preferably used according to the present invention are the titanium halides, in particular titaniumtetrachloride, and the titanium alkoxides, or mixtures thereof. The halogen present in the compounds is preferably chlorine. In the transition metal compounds, the transition metal should generally largely be at its maximum valency. However, if, for instance, titanium compounds are employed, minor quantities of trivalent titanium may be present.

Mixtures of such compounds may also be used, and generally, no restriction is imposed on the components which may be included therein. Any halogenide of alkoxide or any mixed compound that may be used as such, may also be used together with others. Further, even titanium iodide, which is generally not used as such, may be used, in a mixture with other titanium compounds, generally, however, only in minor quantities. In certain cases this appears to exert a favorable influence on the ultimate polymer properties.

In addition to titanium compounds, compounds of other transition metals may be used, namely of vanadium, molybdenum, zirconium or chromium, like $VCl_4$, $VOCl_3$, dialkoxyvanadium dichlorides, $MoCl_5$, $ZrCl_4$, and chromiumacetylacetonate. Of these compounds, the vanadium compounds are preferred.

The Solvent or Diluent

Insofar as the components for the catalyst preparation are not, or cannot be, used in undiluted, liquid form, they are dissolved in inert solvents.

In general, as catalyst component solvent, there may be used straight or branched saturated aliphatic hydrocarbons, such as butanes, pentanes, hexanes, heptanes, or commonly available mixtures thereof, generally known as gasoline, kerosene, gas oil or other petroleum fractions. Cyclic hydrocarbons, like cyclopentane, cyclohexane, methylcyclohexane, as well as aromatic hydrocarbons, notably benzene or halogen-aromatic hydrocarbons, notably chlorobenzene, can also be used. On a technical scale preference is given to the use of saturated aliphatic hydrocarbons.

In a preferred embodiment of the preparation of ther catalyst, first of all an organoaluminum compound, or a solution thereof, is contacted with the solid porous oxide carrier. Preferably, the organoaluminum compound is diluted with a solvent, the volume of such diluent being at least 2 times as large as the volume of the pores of the oxide. The solution contains a quantity of the organoaluminum compound which is approximately equal to the amount that can be chemically bound to the carrier oxide via hydroxyl groups. Preference is given to mixing of the same at ambient temperatures, with stirring then being carried out for between about 1 minute to 1 hour or more. The solvent is separated off by decanting or evaporating, under vacuum if required.

In a subsequent step a solution of an organomagnesium compound is mixed with the reaction product obtained in the first step. Although it is possible to employ different solvents in the various steps of the catalyst preparation, it is preferred to use the same solvent or diluent throughout the procedure.

Contact is again effected by stirring for about 1 minute to 1 hour, conveniently at the ambient temperature. Finally, the solvent is again separated from the solid phase by decanting or evaporating, under vacuum, if required.

By means of so-called micro-wave titrations, in which the organoaluminum compound is titrated with an alkylmagnesium solution, it has been established that a reaction takes place between the aluminum- and the magnesium-compound. It is not clear, however, how the reaction proceeds. There appear to be different points of equivalence, namely at halogen to magnesium rates of 1 and of 3, and, probably, also for the value of 2. At halogen:magnesium ratios of approximately 2 the titration curves show a particularly irregular course and strong deviations occur in the lines obtained by extrapolation of the titration curves at smaller and larger values of the halogen:magnesium ratios. The method of the microwave titrations has been described by E. H. Adema and J. Schrama in Anal. Chem. 37 (1965) 229.

To the reaction product of the aluminum- and magnesium-compound on the carrier, which product has been obtained according to the present process, a solution of a transition metal compound, in particular a tetravalent titanium compound, is added, again preferably in the same solvent/diluent. The solid phase is then separated from the liquid phase by decanting or evaporating the solvent. In order to effect a complete reduction of the transition metal compound, the carrier is now, after all solvent has been separated off, generally heated for some time, preferably for about 1 minute to 1 hour at a temperature of between about 80° to 130° C.

For the preparation of the solid catalytic components according to the present invention there are various other suitable embodiments, in addition to the embodiment described above, and in which first the organomagnesium compound and subsequently the organoaluminum compound is transferred to a porous oxide. For instance, first the magnesium compound may be transferred to the carrier, thereupon the aluminum compound and, finally, the transition metal compound.

The quantities of aluminum- and magnesium-compounds should be chosen that the molar ratio of halogen to magnesium is at least 1. The halogen to magnesium ratio may be appreciably larger, but in general there is no advantage in using values greater than about 100. Preferably, the halogen-magnesium ratio lies between about 2 and 10. The molar ratio of magnesium-+aluminum to titanium may be chosen between wide limits. This ratio is not limited on the upward side, but in general there is no advantage in using too large an excess amount of magnesium+aluminum. From an economical point of view, this soon involves obvious disadvantages. Generally, therefore, said ratio will preferably lie between about 0.1 and about 50, and more particularly between about 0.5 and about 20.

The solid catalyst composition, i.e., the porous carrier on which an organoaluminum compound, an organomagnesium compound and a transition metal compound have been deposited, may finally be activated with an organoaluminum compound, which is, in general, a compound chosen from the group of aluminum-trialkyls, dialkyl-aluminum halides and alkylaluminumhydrides. Instead of alkyl groups, one or more unsaturated hydrocarbon radicals may also be bound to aluminum.

The Polymerization Process

The catalyst composition systems prepared according to the invention may be employed for the polymerization of ethylene, propylene, butylene, pentene, hexene, 4-methyl-pentene, and other alpha-alkenes with at least 3 C-atoms, and also of mixtures thereof. The preferred monomer is ethylene. The ethylene may be copolymerized with minor quantities of up to 10 mol % of other α-alkenes, particularly propylene or butylene, or propylene and butylene.

The present catalyst compositions may also be employed in the copolymerization of one or more alpha-alkenes with polyunsaturated compounds.

The polymerization reaction itself can be carried out in known ways. For instance, by feeding diluent and the organoaluminum compound with which the catalyst is activated to a reactor, and subsequently adding the present catalyst component composition, generally in such quantities that the quantity of transition metal amounts to about 0.001 to 10 mmoles per liter and preferably about 0.01 to about 1 mmole per liter. Thereupon, gaseous or liquid monomer feedstock is introduced.

Also, other embodiments of the polymerization process according to the invention may be utilized. For instance, the activating organoaluminum compounds may be added during the polymerization itself, and such additions may be made either continuously or intermittently. If required, one may entirely omit the activation step preceding the polymerization and activate the catalyst exclusively during the polymerization, or, conversely, the activation may be entirely effected prior to commencing the polymerization reaction. Also, both modes of activation may be employed.

Polymerization is generally carried out at temperatures below the melting point of the polymer, so that a suspension of the solid polymer is obtained.

For diluent, in carrying out the polymerization, any liquid may be used which is inert to the catalyst system including those named above for use in preparing the catalyst. For instance, there may be used one or more saturated straight or branched aliphatic hydrocarbons, liquid under the reaction conditions, such as butanes, pentanes, hexanes, heptanes, pentamethylheptane or petroleum fractions such as light or normal gasoline, naphtha, kerosene, or gas oil; or aromatic hydrocarbons, for instance, benzene or toluene, or halogenated aliphatic or aromatic hydrocarbons, for instance tetrachloroethane.

The polymerization may also be carried out in excess liquid monomer, or in monomer in the supercritical liquid phase.

By preference, particularly for polymerizations on a technical scale, the cheap, saturated aliphatic hydrocarbons, or commercial mixtures thereof, are used for solvent.

The polymerization may be carried out at atmospheric pressure, or at an elevated pressure up to approximately 2000 kg/cm$^2$, and may be carried out either discontinuously or continuously. By carrying out the polymerization under pressure the polymer yields can be increased, which may also contribute to the preparation of a polymer having very low contents of catalyst traces.

Preferably, the polymerization takes place at pressures of from about 1 to 100 kg/cm$^2$, and more particularly from about 10 to 70 kg/cm$^2$.

The polymer suspension obtained in the polymerization can thereafter be worked up in ways already known as such. First of all the catalyst is deactivated, whereupon the catalyst traces can be extracted with solvents suitable for that purpose. However, the catalysts according to the invention are in most cases active to such a degree that the quantity of catalyst in the polymer, notably the content of transition metal, is already so low that removal by washing may frequently be omitted.

In the present process, various modifications already known as such can also be employed. For instance, the molecular weight can be controlled by the addition of hydrogen or other modifying agents, usual in this case. The polymerization may also be carried out in more stages arranged either in parallel or in series, in which, if required, different catalyst compositions, temperatures, residence times, pressures, hydrogen concentrations, etc., may be used in different stages. For instance, products can be prepared having such a broad molecular weight distribution that they possess a high, so-called flow index, by so choosing the conditions in the one stage, e.g., for pressure, temperature and hydrogen concentrations, that a polymer with a high molecular weight forms, while in another stage these conditions are so chosen that a product with a lower molecular weight forms.

For preparation of polymers having a broad molecular weight distribution the polymerization may be advantageously carried out in 2 or more stages, in which catalysts are employed with different aluminum:magnesium or (aluminum+magnesium):titanium ratios.

With the aid of the present catalysts α-alkenes can also be polymerized in the gaseous phase by known techniques, i.e., in the absence of a distributing agent. For instance, use may be made of the process described for another catalyst composition in the British Patent Specification 1.373.982.

THE EXAMPLES

The invention will now be further elucidated by the following Examples without, however, being limited thereby.

EXAMPLE 1 a. Catalyst Preparation

As carrier an aluminum oxide available under the tradename of Ketjen, grade B, having an average particle size of 65μ and a fineness parameter of n=7.2 is used. The fineness parameter n according to Rosin-Rammler is a measure of the particle size distribution, which number n is larger according as the distribution is narrower and as is elucidated in more detail in, for instance, the standard DIN 66145, that defines average particle size and Rosin-Rammler parameter n and the way wherein average particle size $\bar{d}$, and n are determined. This aluminum oxide is heated to 700° C. For 4 hours under a nitrogen stream, whereupon the hydroxyl group content is 0.96 mmole/g of aluminum oxide.

Under nitrogen, 100 ml of gasoline in which 12 mmoles of monoethylaluminumdichloride (MEAC) is dissolved is introduced into 10 g of the aluminum oxide, treated, as just described. Subsequently, 100 ml of gasoline is evaporated at 80° C. whilst nitrogen is passed through. 100 ml of gasoline in which 5.0 mmoles of dibutylmagnesium (DBM) is dissolved is then added to the so-treated carrier material, and, next, evaporation of the gasoline takes place again at 80° C. The solution of dibutylmagnesium in gasoline has been prepared according to the process described in the U.S. Pat. No. 3,737,393 and contains 10 mol.-% of triisobutylaluminum with respect to the magnesium content. Finally, again 100 ml of gasoline is added, in which now, however, 1.7 mmoles of titaniumtetrachloride is dissolved, and again the gasoline is evaporated, in the same manner at 80° C. The carrier material has now turned brown in color. The resulting catalyst composition mass was subsequently absorbed again in 100 ml of gasoline.

b. Polymerization

To a reactor, having a volume of 3 liters, are transferred successively 1.8 l of gasoline and 3 ml of a 2 molar solution of triisobutylaluminum in gasoline (about 1 mmole/l). The temperature is brought to 60° C., whereupon the gasoline is saturated with a mixture of ethylene and hydrogen.

1.32 ml of the catalyst suspension prepared according to the method described above is added. The titanium concentration in the reactor amounts to 0.0125 mmoles/l. Next, a mixture of ethylene and hydrogen is introduced to a total pressure of 9 ats guage. The temperature is now brought to 85° C. and the pressure kept at 9 ats guage with ethylene and hydrogen. In order to regulate the molecular weight such an amount of hydrogen is supplied that the purge gas from the reactor contains 30 vol.-% of $H_2$.

The polymerization is finished after 1 hour.

The yield amounts to 444 g of polyethylene per mmole of titanium per hour and per atm. ethylene pressure.

The average particle size of the polymer is 450μ, the fineness parameter n amounts to 5.2, i.e., the grain size distribution is narrow and only little wider than that of the carrier.

EXAMPLE 2 a. Catalyst Preparation

In a way similar to that of Example 1, an aluminum oxide with an average particle size of 60μ and a fineness parameter of n=2.3 is dried for 4 hours at 750° C. under a nitrogen stream. The dried aluminum oxide contains 1.0 mole of hydroxyl groups per gram of aluminum oxide.

According to the method described in Example 1, 12 moles of monoethylaluminumchloride, 6 mmoles of dibutylmagnesium and 0.7 mmole of titaniumtetrachloride are sequentially transferred to and taken up by 10 g of the dried aluminum oxide (designated hereinafter as catalyst A).

For the sake of comparison, another 10 g of the same dried aluminum oxide is stirred up with 100 ml of gasoline, whereupon 12 mmoles of monoethylaluminumchloride dissolved in 3.3 ml of gasoline is added, whereupon stirring is carried out for 15 minutes. Next, 6.0 mmoles of dibutylmagnesium dissolved in 18 ml of gasoline is added, following which, again, stirring takes place for 15 minutes, and finally 0.7 mmole of titaniumtetrachloride dissolved in 0.7 ml of gasoline is added. After 15 minutes stirring the suspension is concentrated by evaporation at 80° C. (designated hereinafter as catalyst B).

Subsequently, also for the sake of comparison, 150 ml of a 0.3 molar solution of monoethylaluminumchloride, 75 ml of 0.3 molar dibutylmagnesium solution and 25 ml of 0.3 molar titaniumtetrachloride solution are combined at −20° C. with a stirring and stirred at −20° C. for 3 hours. All three catalyst components are dissolved in low-boiling gasoline. 33.3 ml of the mixture is added to another 10 g of dried aluminum oxide, treated as described above, whereupon the gasoline is evaporated at 80° C. in the way described previously whilst nitrogen is passed through (designated hereinafter as catalyst C).

Each of the catalysts A, B and C is then suspended in 100 ml of gasoline.

b. Polymerization

Polymerizations of ethylene with the catalysts A, B and C is carried out in the way described in Example 1b, such a quantity of catalyst being used that the titanium concentration in the reactor amounts to 0.0125 mmole/l. The results are rendered in the Table.

TABLE

| | catalyst components mmoles/10 g $Al_2O_3$ | | | | | | |
|---|---|---|---|---|---|---|---|
| Cat. | MEAC | DBM | $TiCl_4$ | Activity | Bulk Dens. | $\bar{d}$ | n |
| A | 12 | 6.0 | 0.7 | 750 | 0.34 | 330 | 2.4 |
| B | 12 | 6.0 | 0.7 | 530 | 0.36 | 270 | 2.1 |
| C | 6 | 3.0 | 1.0 | 2116 | 0.26 | 250 | 1.7 |

The activity is recorded as the number of grams of polymer obtained per hour per mmole of titanium compound per atmosphere ethylene pressure. Catalyst A, prepared according to the method of the present invention, has a composition which is identical to that of catalyst B which had been prepared conventionally, for comparison. It will be seen that catalyst A has a larger activity than catalyst B. Further, the average polymer particle size from catalyst A is obviously coarser than that from catalyst B, and the particle size distribution differs very little from and is practically as narrow as that of the aluminum oxide carrier, while that from catalyst B is somewhat broader.

Though catalyst C has a larger activity, the average particle size, nevertheless, is smaller. The bulk density is also low and the particle size distribution is clearly much broader than that of the aluminum oxide carrier.

EXAMPLE 3 a. Catalyst Preparation

According to the process described in Example 1a, an aluminum oxide which is commercially available under the tradename Ketjen, grade H, having an average particle size of 22μ and n=2.2, is heated at 700° C. for 4 hours in a nitrogen stream. The aluminum oxide then contains 0.95 mmole of hydroxyl groups per gram.

In the way described in Example 1a, 11.25 mmoles of MEAC, 5.62 mmoles of DBM, and 1.87 mmoles of titaniumtetrachloride are transferred to 10 g of aluminum oxide.

b. Polymerization

Polymerization of ethylene carried out according to the process described in Example 1b yields a polyethylene having an average particle size of 250μ and n=2.0. The activity is 885 g of polyethylene per hour per mmole of titanium compound per atmosphere ethylene pressure.

EXAMPLE 4 a. Catalyst Preparation

According to the process described in Example 1a, a silicon dioxide available under the tradename Ketjen F5, having an average particle size 60μ and n=3.5, is heated at 700° C. for 4 hours under a nitrogen stream. The silicon dioxide then contains 1.5 mmoles of hydroxyl groups per gram. According to the process described in Example 1a, 20 mmoles of MEAC, 10 mmoles of DBM, and 3.3 mmoles of titaniumtetrachloride are transferred to 10 g of this silicon dioxide.

b. Polymerization

Polymerization of ethylene was carried out according to the process of Example 1b, with the catalyst prepared according to Example 4a, yields a polymer having an average diameter of 790μ and n=2.9. The catalyst activity is 530.

These Examples show that with the process according to the invention, polyalkenes, in particular polyethylenes, can be prepared in the form of powders having a particle size distribution as shown by the Rosin-Rammler parameter n which deviates only very little from that of the carrier.

Further, using the catalyst compositions proposed by this invention, it can be seen that the particle size distribution of the resulting polymer to be prepared can thus be essentially pre-determined by selection of the particle size of the catalyst carrier component employed in the process.

The disclosures of each of the referenced publications and patent applications, identified hereinabove, are incorporated into this specification by reference.

What is claimed is:

1. A process for preparing a catalyst component composition suitable for α-alkene polymerization reactions, which consists essentially in treating a carrier material selected from the group consisting of a solid porous particulate inorganic carrier having an average particle size of between about 0.1 and 200 microns, and composed of oxidic materials or compounds of metals from Groups I and II of the Periodic Table, and a particulate polyalkene powder, by the steps of:

(a) contacting said carrier material with a first liquid phase containing an organometallic compound selected from the group consisting of an organoaluminum halide compound of the general formula $R_mAlX_{3-m}$ wherein each R independently represents a hydrocarbon radical with 1 to 30 carbon atoms, each X represents a halogen atom, and m is a number smaller than 3, and an ether-free solution containing an organomagnesium compound of the general formula $MgR_2'$ wherein each R' independently represents a hydrocarbon radical having from 1 to 30 carbon atoms, whereafter said carrier material so treated is separated from said first liquid phase;

(b) thereafter contacting said carrier material so treated with a second liquid phase containing the other organometallic compound member of said group whereafter said carrier material so treated is separated from said second liquid phase, so that said carrier material has then been contacted separately with an organoaluminum halide compound and with an organomagnesum compound; and (c) thereafter contacting said carrier material so treated with a third liquid phase containing a titanium compound selected from the group consisting of halides, alkoxides and mixtures thereof wherein said titanium is in the highest valency, so as to effect reduction of said titanium compound to a lower valency state on said treated carrier material.

2. The process of claim 1, wherein said inorganic carrier has an internal porosity larger than about 0.6 cm$^3$/g.

3. The process of claim 1, wherein said inorganic carrier has a specific surface area larger than about 50 m$^2$/g and up to about 500 m$^2$/g.

4. The process of claim 1, wherein said inorganic carrier has an amount of chemically bound water of at most 5 mmols of hydroxyl groups per gram.

5. The process of claim 1, wherein said R represents an alkyl group having from 2 to 8 carbon atoms.

6. The process of claim 1, wherein said organomagnesium compound is a dialkyl magnesium compound having from 1 to 10 carbon atoms in the alkyl group.

7. The process of claim 1, wherein said transition metal compound is titaniumtetrachloride or an titaniumtetraalkoxide.

8. The process of claim 1, wherein said first and second liquid phases are separated from said carrier material so treated by decantation.

9. The process of claim 1, wherein said first and second liquid phases are separated from said carrier material so treated by evaporation.

10. The process of claim 1, wherein the molar ratio of halogen atoms to magnesium atoms on the treated carrier is at least 1 and up to about 100.

11. The process of claim 1, wherein the molar ratio of the combined magnesium and aluminum atoms to the titanium atoms on the treated carrier is in the range between about 0.1 and about 50.

12. The process of claim 1, further including the step of subsequently activating said resulting carrier-catalyst component composition by contacting the same with a compound selected from the group consisting of aluminum trialkyls, dialkylaluminum halides and alkylaluminum hydrides.

13. The catalyst carrier component composition prepared by the process of claim 1.

* * * * *

UNITED STATES PATENT AND TRADEMARK OFFICE
CERTIFICATE OF CORRECTION

PATENT NO. : 4,173,547
DATED : November 6, 1979
INVENTOR(S) : Reiner J.L. Graff

It is certified that error appears in the above-identified patent and that said Letters Patent are hereby corrected as shown below:

In column 11, line 8, change "1,0 mole" to read --1,0 mmole--.

In column 11, lines 10-11, change "12 mole" to read --12 mmole--.

Signed and Sealed this

First Day of April 1980

[SEAL]

Attest:

SIDNEY A. DIAMOND

Attesting Officer

Commissioner of Patents and Trademarks